(12) United States Patent
López Barbarin (10) Patent No.: US 12,527,264 B2
(45) Date of Patent: Jan. 20, 2026

(54) TYING TOOL

(71) Applicant: DESARROLLOS ESPECIALES DE SISTEMAS DE ANCLAJE, S.A., Barcelona (ES)

(72) Inventor: Daniel López Barbarin, Pamplona (ES)

(73) Assignee: DESARROLLOS ESPECIALES DE SISTEMAS DE ANCLAJE, S.A., Barcelona (ES)

( * ) Notice: Subject to any disclaimer, the term of this patent is extended or adjusted under 35 U.S.C. 154(b) by 0 days.

(21) Appl. No.: 18/875,863

(22) PCT Filed: May 31, 2023

(86) PCT No.: PCT/ES2023/070358
§ 371 (c)(1),
(2) Date: Dec. 17, 2024

(87) PCT Pub. No.: WO2023/242455
PCT Pub. Date: Dec. 21, 2023

(65) Prior Publication Data
US 2025/0197160 A1    Jun. 19, 2025

(30) Foreign Application Priority Data
Jun. 17, 2022   (ES) ............................... ES202230535

(51) Int. Cl.
*A01G 17/08*    (2006.01)
*B65H 69/04*    (2006.01)

(52) U.S. Cl.
CPC .............. *A01G 17/08* (2013.01); *B65H 69/04* (2013.01)

(58) Field of Classification Search
CPC ...... B65H 69/04; A01G 17/08; B65B 13/025; B65B 13/345
(Continued)

(56) References Cited

U.S. PATENT DOCUMENTS 5,397,045 A * 3/1995 Lucas ..................... B65B 25/02
227/143
5,778,946 A    7/1998 Pellenc et al.
(Continued)

FOREIGN PATENT DOCUMENTS

EP    3133913 A1    3/2017
EP    3794937 A1    3/2021
(Continued)

OTHER PUBLICATIONS

Translation KR 101982706.*

*Primary Examiner* — Shaun R Hurley
(74) *Attorney, Agent, or Firm* — FisherBroyles, LLP; Roger L. Browdy; Ronni S. Jillions (57) ABSTRACT

A tying tool for tying at least two elements to be joined, including a longitudinal body or handle extending in a longitudinal direction from a proximal end to a distal end and comprising a pushbutton activating at least a main motor and a secondary one connected at least to a feeding mechanism, a holding mechanism and a closing mechanism carrying out the tying of at least two elements to be joined by a holding element and a closing element of the holding element. The tying takes place in a semiautomatic manner by the holding element that is an elastic and flexible elastomer that surrounds the elements to be joined with a controllable tension, and it is closed a closing element.

12 Claims, 10 Drawing Sheets

(58) Field of Classification Search
USPC .......................................................... 289/17
See application file for complete search history.

(56) References Cited

U.S. PATENT DOCUMENTS

| | | | | |
|---|---|---|---|---|
| 6,382,289 | B1* | 5/2002 | Jho | A01G 17/085 100/6 |
| 2004/0020550 | A1 | 2/2004 | Dombray et al. | |
| 2004/0237805 | A1* | 12/2004 | Hayashi | A01G 17/08 100/1 |
| 2005/0028497 | A1* | 2/2005 | Hayashi | A01G 17/085 53/592 |
| 2008/0104886 | A1* | 5/2008 | Nakamura | A01G 17/08 47/1.01 S |
| 2013/0125461 | A1* | 5/2013 | Seo | A01G 17/085 47/1.01 S |
| 2015/0181810 | A1* | 7/2015 | Cho | A01G 17/08 227/120 |
| 2017/0359971 | A1* | 12/2017 | Hayashi | A01B 1/00 |
| 2017/0359972 | A1* | 12/2017 | Hayashi | A01G 17/085 |
| 2017/0359973 | A1* | 12/2017 | Taguchi | B65B 13/16 |
| 2017/0361957 | A1* | 12/2017 | Takemura | B65B 13/025 |
| 2017/0361958 | A1* | 12/2017 | Hayashi | A01G 17/08 |
| 2017/0361959 | A1* | 12/2017 | Ishiguro | B65B 13/345 |
| 2017/0361960 | A1* | 12/2017 | Taguchi | B65B 13/16 |
| 2018/0099768 | A1* | 4/2018 | Takemura | B65B 13/345 |
| 2019/0223389 | A1 | 7/2019 | Cho | |
| 2021/0053705 | A1* | 2/2021 | Taguchi | B65H 49/36 |
| 2021/0053706 | A1* | 2/2021 | Taguchi | B65B 13/345 |
| 2021/0053707 | A1* | 2/2021 | Taguchi | B25C 5/0207 |
| 2021/0053708 | A1* | 2/2021 | Taguchi | B32B 37/0046 |
| 2021/0053709 | A1* | 2/2021 | Taguchi | B65B 13/345 |

FOREIGN PATENT DOCUMENTS

| | | | | |
|---|---|---|---|---|
| FR | 2830408 | A1 | 4/2003 | |
| KR | 101982706 | B1 * | 5/2019 | ............. A01G 17/08 |
| WO | WO-2015162595 | A1 * | 10/2015 | ............. A01G 17/08 |

* cited by examiner

TYING TOOL

TECHNICAL FIELD

The invention refers to a tying tool used in any sector where two elements need to be tied, such as for example the agricultural field.

STATE OF THE ART

Several closing systems for joining two or more elements are known. The most known tying tools or systems can be divided in two large groups, rigid tying tools and elastic tying tools. Rigid tying tools use staples, tape or wire to join the elements, while known elastic tying is carried out using some type of elastic tape or cord cut from a roll or the known rubber anchor, these elements being manually tied around the elements to be joined.

On one side, the tying processes using rigid joining elements may be manual, automatic or semiautomatic. A number of rigid connection tying tools using staples or tapes are known in the market, such as the tools disclosed in published documents FR2830408A1 and EP3133913B1. Tools used by the hands are disclosed, but part of the movement is assisted by a mechanism aided by a power source such as electricity.

Published document FR2830408A1 discloses a planta tying instrument comprising a longitudinal body or handle comprising grasping means, torsion means and cut means to carry out the tying by means of a yarn or wire rolled in a spool at the final end of the handle and guided towards the grasp, torsion and cutting means. The tying instrument of the French document is characterized in that the gripping means is structured as a clamp with two clamp arms that spontaneously are kept in a closed position, with a pivot articulation on the rotating head, between the opening spontaneous position and a head closing position and the means for displacing the wire and taking the corresponding end of the end yarn between the first gripping means towards the clamp, push the opening of the clamp and force the end of the wire between the clamp arms for maintenance.

While patent EP3133913B1 discloses an apparatus for semi-automatically joining at least two elements one to the other. The apparatus comprises two arms with mutual reciprocating motion, commanded by an electric motor, between an inactive position, where two of the ends are far from one another, and at least one operative position where the two ends are in contact, or one close to the other. There is a feeding device in a first arm configured to selectively advance a joining element and there is a holding device in the second arm configured to temporarily hold the joining element at least when said arms are in said operative position. The joining element being made of wire or PVC.

This type of tool is commonly used in the agricultural sector, given the need for many plants to be guided by stakes to ensure that they grow vertically. Generally, the guides or stakes are rigid elements joined to the plant stem by means of holding elements. The provision of the holding elements in the plants is critical. They must be placed gently, preventing the plant from being strangled by sufficiently tight for the holding element not to slide down the stake. For example, the tools mentioned above have a disadvantage in the long term, since when the plant grows joined to the stake, the rigid holding element, such as a wire, does not allow the plant to grow freely due to an excessive pressure that the connection exerts on the stem (an effect known as strangling).

On the other hand, it is known that tying by means of elastic elements such as e.g., anchor rubber or elastic cords, tied manually by means of a knot, reduce the strangling in the joined elements. However, these are manual application processes requiring effort from the operator due to the elastic resistance of the elastic elements when returning to their natural state. The manual application in these cases slows the tying process down and, further, it is a laborious task for the operator. Further, in those cases where a correction is needed due to a wrong positioning of the connection, the holding elements need to be taken out and placed again manually.

The object of the invention is a semiautomatic elastic tying tool having at least two elements to improve the tying process between at least two elements to be joined, such as a plant and a stake, reducing strangling when the plant grows.

BRIEF DESCRIPTION OF THE INVENTION

The object of the invention is a tying tool for joining at least two elements by means of a holding element and a closing element of the holding element in a semiautomatic manner. The tool comprises a longitudinal body or handle extending in a longitudinal direction from a proximal end to a distal end and comprises a pushbutton activating, by means of an electronic board, a sequence of feeding, holding, and closing and cutting of the holding element and closing around at least two elements to be joined by means of at least a main motor in the proximal end and a secondary motor. In short, the semiautomatic tools comprise at least a feed mechanism, a holding mechanism, and a closing mechanism, activated by means of a pushbutton.

On one hand, the feed mechanism of the holding element is activated by means of a secondary motor and comprises a guide connected to a spool at the proximal end of the handle, where the holding element is rolled, and it extends from the spool to a feed head at the distal end of the tool below the handle. The feed head feeds the tool with the holding element from the spool towards the outside to be caught by the holding mechanism.

On the other hand, the main motor activates the holding mechanism of the holding element comprising a moving arch extending from an axis at a central area of the handle to a holding head positioned over the feed head. While the closing mechanism of the holding element comprises a number of closing elements provided towards a closing system of the closing element inside the handle.

The tool of the invention is characterised in that the tying is carried out in a semiautomatic manner, by means of a holding element being an elastomer having elastic and flexible properties used to surround at least two elements to be joined in an elastic manner and is closed by means of a closing element, staple-like.

BRIEF DESCRIPTION OF DRAWINGS

The details of the invention are shown in the attached figures which do not intend to limit the scope of the invention.

DETAILED DESCRIPTION OF THE INVENTION

Figure 1:
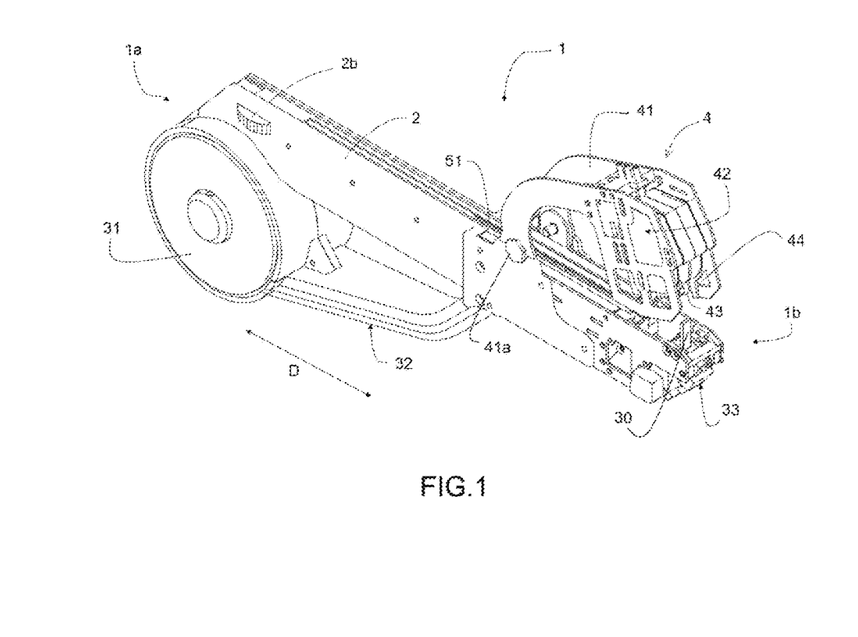
FIG. 1 shows a perspective view of the tool of the invention.
Figure 10:
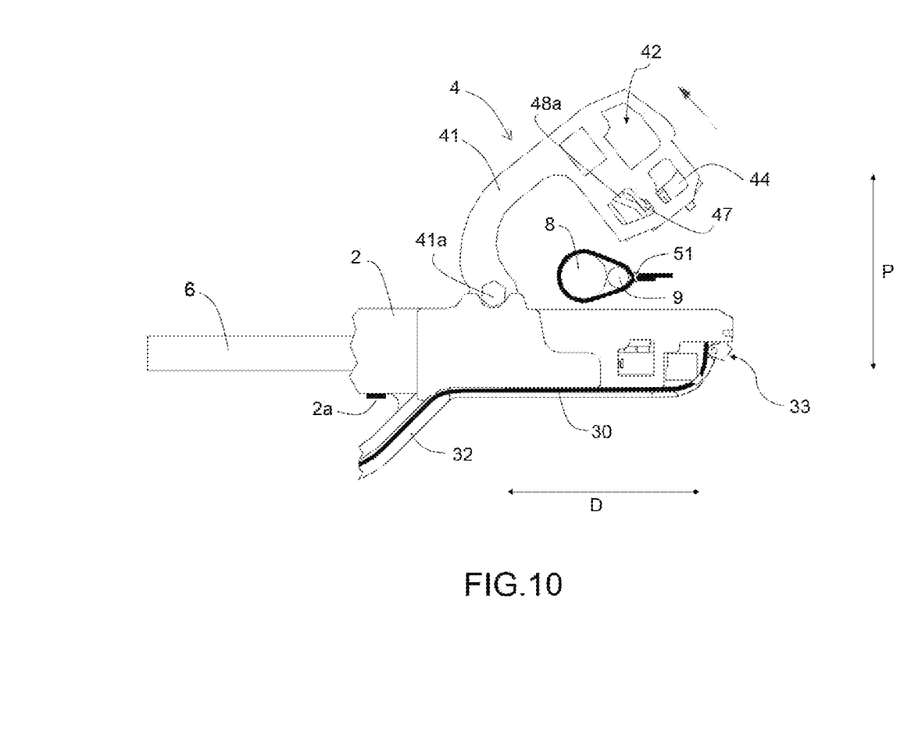
FIG. 10 shows a side cross-section view of the distal end of the tool of FIG. 1 in the initial position after tying the elements (8, 9) to be joined.

The invention refers to a tying tool (1) as shown in FIG. 1 for tying at least two elements (8, 9) to be joined, such as a plant and a stake, in a semiautomatic manner as shown in FIG. 10 after finishing the tying sequence after using the tool (1). The semiautomatic tying is due to the tool (1) being activated by manually pushing a pushbutton (2a) provided below a handle (2) making up the body of the tool (1) for automatically activating a main motor (6) and a secondary motor (34) by means of an electronic board and fed by a battery or an electrical power grid.

As shown in FIG. 1, the tool (1) comprises a longitudinal body or handle (2) extending in a longitudinal direction (D) from a proximal end (1a), where a selection dial (2b) is provided, to a distal end (1b). Also, from a proximal end (la) where a spool (31) is provided, to a distal end (1b), where the feeding head (33) is provided, extends a feeding mechanism of a holding element (30) below the handle (2). The holding element (30) exits through the feeding head (33) to surround at least two elements (8, 9) to be joined. At said distal end (1b), at least a mobile holding mechanism (4) over part of the feeding mechanism, specifically over the feeding head (33) of the holding element (30), is found. Along the handle (2), inside it, also a closing mechanism (5) of the holding element (30) by means of a closing element (51) is found. Where the closing mechanism (5) extends from the centre of the handle (2) towards the distal end (1b) of the handle (2). That is, the automatic tying carried out by the tool (1) of the invention takes place by a holding element (30) surrounding at least two elements (8, 9) and a closing element (51) that closes or fixes the holding element (30) around at least two elements to be joined (8, 9).

Figure 5:
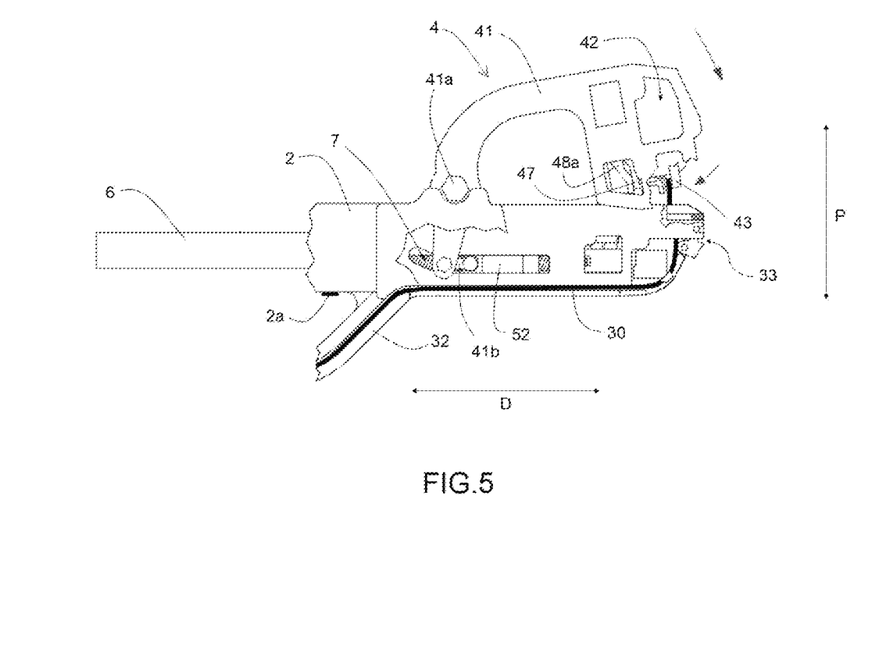
FIG. 5 shows a side cross-section view of the distal end of the tool of FIG. 1 in a hooking position of the tying sequence.
Figure 9A:
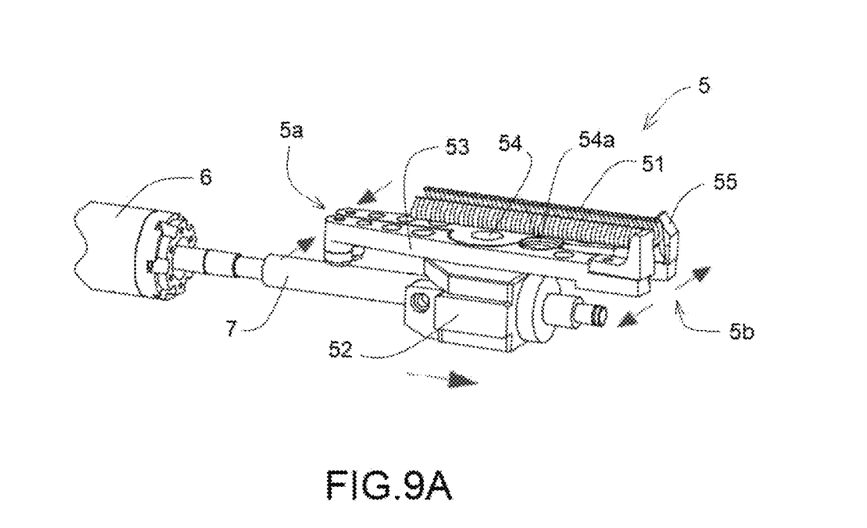
FIG. 9A shows a perspective view of the closing mechanism in the initial or standby position.
Figure 9B:
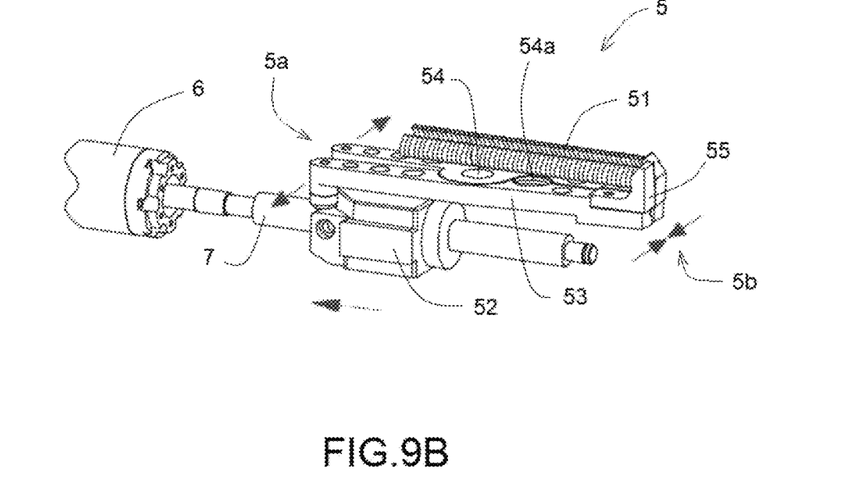
FIG. 9B shows a perspective view of the closing mechanism in the closing position.

The main motor (6) is found at the proximal end (1a) of the tool (1) and it activates the movement of a wedge (52) over a shaft (7) provided inside the handle (2) from a distal end (1b) towards a proximal end (1a) and oriented towards the proximal end (1a), as shown in FIGS. 5 and 9. As also shown in FIGS. 5 and 9, connected to the wedge (52) there is an arch (41) of the holding mechanism (4) and over the wedge (52) the closing mechanism (5) of the holding element (30) shown in FIGS. 9A and 9B is found. As explained below, the wedge (52) comprises at least two positions for activating the different mechanisms connected thereto.

Figure 2:
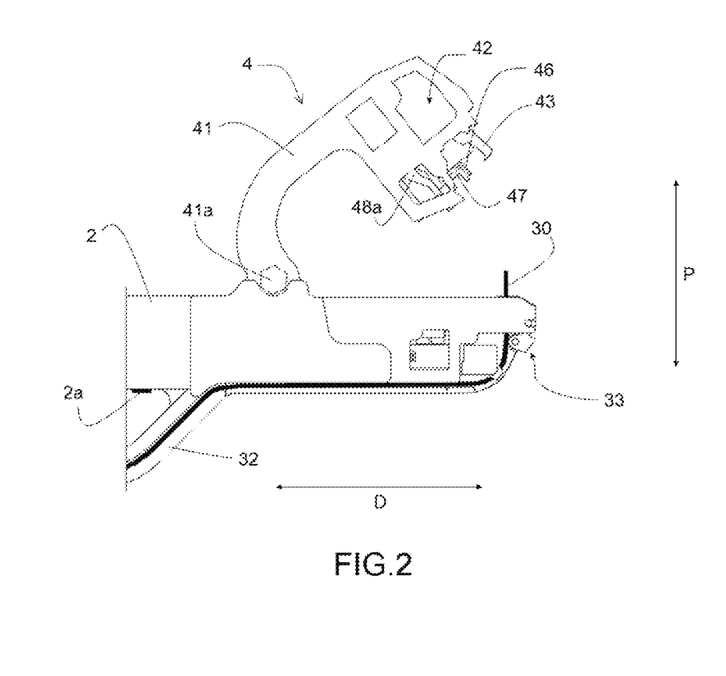
FIG. 2 shows a side cross-section view of the distal end of the tool of FIG. 1 in an initial position of the tying sequence.

FIG. 1 shows the feeding mechanism of the holding element (30) of tool (1) comprising a spool (31) at the proximal end (1a) of the handle (2) where the holding element (30) is rolled. The spool (31) is connected to a guide (32) extending from the spool (31) to a feeding head (33) through which the holding element (30) is passed below the handle (2), as shown in FIG. 2. The holding element (30) exits towards the outside through the feeding head (33), as shown in the figures. The inside of the feeding head (33) is shown in more detail in FIGS. 3A and 3B, where it is shown to comprise a secondary motor (34) activated by means of a pushbutton (2a) activating the electronic board managing the parameters and moments of the movements of both the main (6) and secondary (34) motors. The secondary motor (34) is joined at least to a gearwheel system (34a) it rotates, said system being joined at least to a system of opposing rollers (34b) allowing the holding element (30) to displace between the rollers (34b) in a direction perpendicular (P) to the longitudinal direction (D), that is, towards a groove (36) provided at the distal end (1b) of the feeding head (33). Additionally, connected to the electronic board commanding the secondary motor (34), a selection dial (2b) is found at the proximal end (1a), where the quantity of holding element (30) to be supplied by the feeding head (33) towards the outside through groove (36) is selected. The feeding head (33) also comprises a cutting mechanism comprising a blade (35) for cutting the non-free end of the holding element (30) after the tying, that is, the end joined to the spool (31). The tool (1) is characterized in that the holding element (30) provided by the feeding mechanism is an elastic and flexible elastomer intended to surround at least two elements (8, 9) to be joined in an elastic manner, as shown in the figures.

Figure 3A:
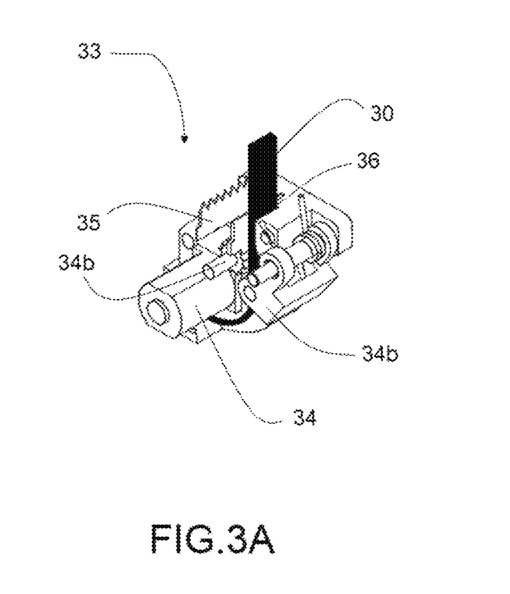
FIG. 3A is a perspective view of the roller system of the feeding head of the tool of FIG. 1.
Figure 3B:
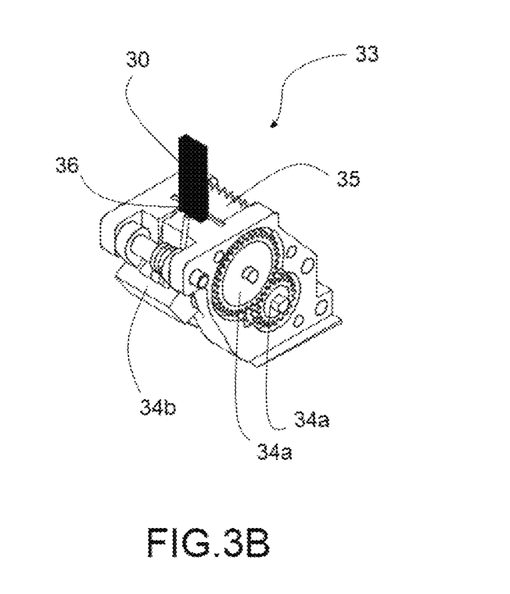
FIG. 3B is a perspective view of the roller system of the feeding head of the tool of FIG. 1.

Preferably, the holding element (30) used for the tying step carried out by the semiautomatic tool (1) of the invention is an elastomer, therefore to ease the feeding step by the feeding head (33) at least one of the rollers (34b) has grooves for creating greater friction on the surface of the holding element (30) to achieve a greater dragging force to the holding element (30) in a direction (P) towards the outer groove (36) of the feeding mechanism.

To carry out the tying of at least two elements (8, 9) by surrounding them with the holding element (30), the holding mechanism (4) of the tool (1) of the invention comprises a mobile arch (41) and a holding head (42). The arch (41) is movable with respect to an axle (41a) in an central area of the handle (2) where it is joined to the wedge (52) at least by two rods (41b) and it extends towards the holding head (42) at the distal end (1b) of the tool (1) over the feeding head (33), as shown in FIGS. 1 and 2. The holding mechanism (4) comprises 3 positions or situations with respect to the feeding head (33) during the operation of the tool (1): the initial position, the hooking position, and the closing and cutting position, as explained in greater detail below.

Figure 2A:
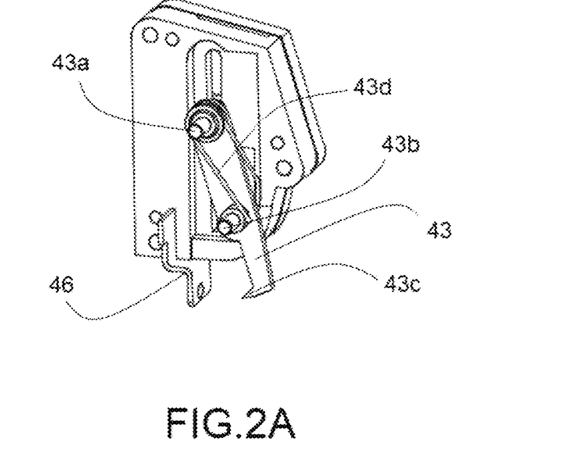
FIG. 2A shows a detailed view of the holding head with the open hook of FIG. 2.
Figure 6:
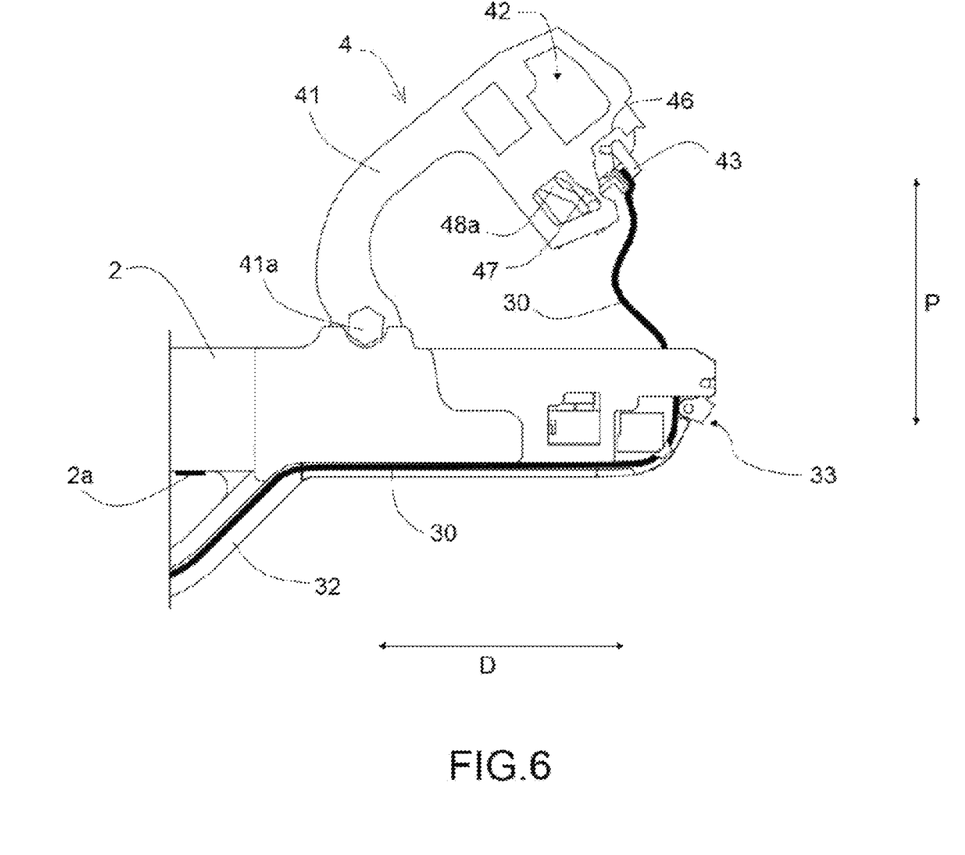
FIG. 6 shows a side cross-section view of the distal end of the tool of FIG. 1 in the hooking position of the holding element with the arch open in the initial position.

The holding head (42) of the tool (1) is shown in FIGS. 2, 4 to 8 and 10. The holding head (42) is shown in greater detail in FIGS. 2, 2A and 4A to 4E, where it is shown to comprise an activating element (44) and a hook (43) joined and mobile one with respect to the other at a distal end and inside the holding head (42). On one side, the activating element (44) comprises a longitudinal and mobile body in a perpendicular direction (P) through a groove of the holding head (42). Further, the activating element (44) is characterized by comprising at least two guides, a longitudinal upper guide (44a) to guide the movement in the perpendicular direction (P) of the activating element (44) and a lower guide (44b) having a shape similar to an "U" with an inclined base in a direction (D) and ends intended to block the movement of the hook (43), a lower protrusion (44c) and a lateral protrusion (44d) connected to an activating spring (45) at the proximal end of the holding head (42). On the other hand, the hook (43) comprises a longitudinal body in a direction (P) that is movable from at least two connection points, an upper point (43a) and a lower point (43b) connected by a spring (43d) intended to place the hook (43) at the closing position. The hook (43) further comprises a punch (43c) at a lower end in a direction (D) and protruding towards the proximal end (1a) of the tool (1). Preferably, the hook (43) is joined to the activating element (44) by at least the connection points (43a, 43b), where the upper connection point (43a) is provided inside the upper guide (44a) of the activating element (44) and the lower connection point (43b) is provided inside the lower guide (44b) of the activating element (44), where the connection points (43a, 43b) can displace along the guides (44a, 44b) respectively. Additionally, in the same manner as the holding mechanism (4), the holding head (42) or specifically the activating element (44) and the hook (43) comprise at least 5 positions with respect to the sequence they carry out in the semiautomatic tying of at least two elements (8, 9) to be joined, as shown in FIGS. 4A to 4E. FIG. 4A shows the hook (43) in an open position and blocked by the lower guide (44b), since the lower connection point (43b) is at an end of the lower guide (44b), maintaining the holding mechanism (4) in the initial position. In FIG. 4B, the hooking phase has begun, where the activation element (44) moves in the direction (P), releasing the lower connection point (43b) from the end of the lower guide (44b), such that the hook (43) is shown closed and unblocked; however, when the hooking phase ends, pressure against the activation element (4) is ceased, and it returns to the initial position thanks to the activation spring (45) and the hook (43) is closed and blocked at the other end of the lower guide (44b), as shown in FIG. 4C. When the hook (43) is closed and blocked, the punch (43c) collides and fits against a fixation plate (46) comprising a hole opposing the punch (43c) protruding from the hook (43), as shown in FIG. 2A. After the hooking shown in FIG. 5, the arch (41) opens completely, as shown in FIG. 6, and thereafter the closing operation of the holding element (30) begins, where the arch (41) of the holding mechanism (4) closes again, activating the activation element (44) again, such that the hook (43) starts to open as shown in FIG. 4D until opening completely as shown in FIG. 4E. When the arch (41) opens again, the activation element (44) is pushed by the activation spring (45), such that one of the ends of the lower guide (44b) blocks the lower connection point (43b) of the hook (43) in the open position.

Additionally, as shown in FIGS. 2, 5 to 8 and 10, the holding head (42), in addition to the fixation plate (46), comprises a cutting pusher (47), a guide element (48a), and a closing pusher (48b) provided in a fixed manner from the activation element (44) of the distal end towards a proximal end respectively. Where the guide element (48a) and the closing pusher (48b) are longitudinal elements in a direction (P) from the holding head (42) provided at the proximal end of the holding head (42) to cooperate in different areas with the closing mechanism (5). On one side, the closing pusher (48b) pushes the holding element (30) to introduce it inside the closing elements (51). Furthermore, the closing pusher (48b) comprises an inner spring to allow the closing pusher (48b) to raise towards the inside of the holding head allowing the arch (41) to keep moving down towards the feeding head (33). On the other hand, the guide element (48a) guides the holding element (30) laterally, pushing it vertically in a direction (P) to keep it inside the closing elements (51). In conclusion, with elements (48a and 48b) it is ensured that the holding element (30) is found inside the closing element (51) during the closing process of the holding element (30). While the cutting pusher (47) comprises an "L" shaped body having at least two protrusions (47a, 47b) shaped as a two-forked hoe at the lower end, as shown in detail in FIG. 8. The cutting pusher (47) pushes the ends of the holding element (30) against the blade (35) to cut the non-free end of the holding element (30), that is, to cut the end joined to the spool (31) located between the two protrusions (47a, 47b) of the cutting pusher (47).

As shown in FIG. 5, by means of the hook (43) and the fixation plate (46), the holding element (30) coming out of the groove (36) of the feeding head (33) is fixed or held. Specifically, the punch (43c) protrusion holds the holding element (30) by pushing it against the fixation plate (46), and introducing partially the holding element (30) in a hole of the fixation plate (46) to block the holding element (30) and tighten the holding element (30) against the elements (8, 9) to be joined to carry out a tensioned tying, in addition to preventing the holding element (30) from becoming loose from the holding head (42).

Figure 7:
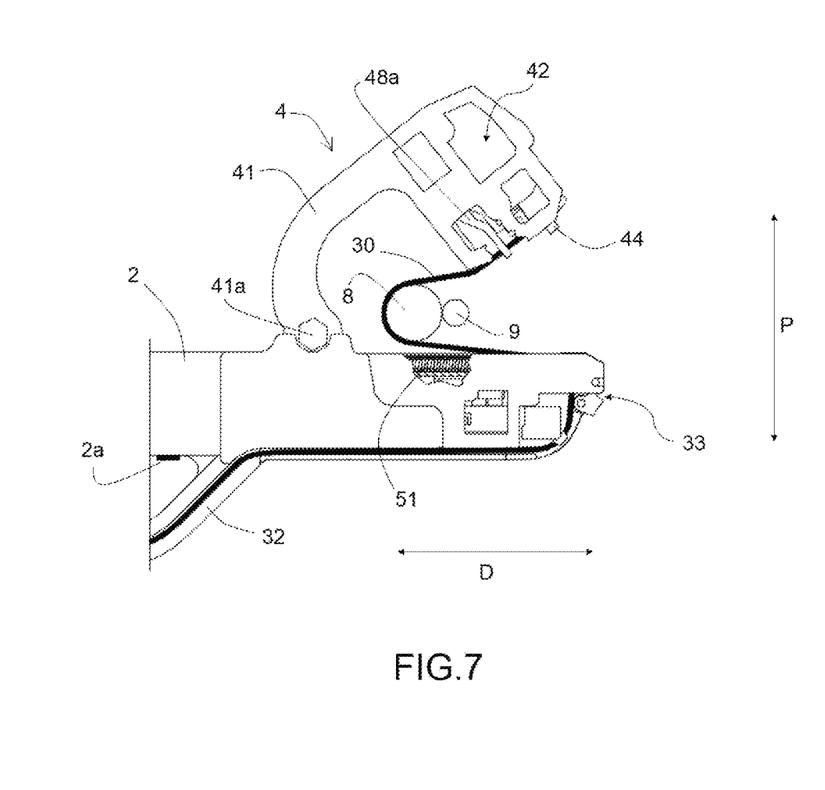
FIG. 7 shows a side cross-section view of the distal end of the tool of FIG. 1 in the position of FIG. 6 with the elements to be joined introduced into the arch of the holding mechanism.
Figure 8:
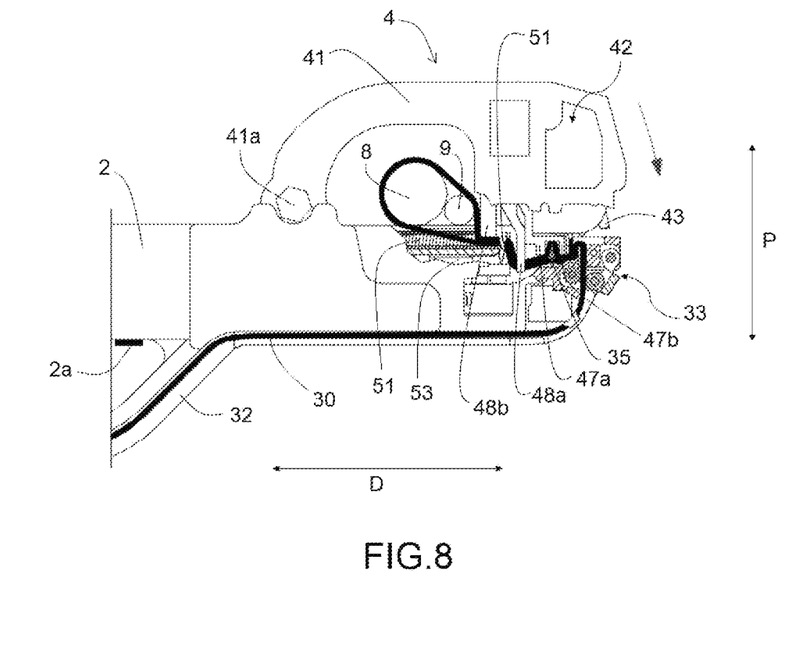
FIG. 8 shows a side cross-section view of the distal end of the tool of FIG. 1 in the closing and cutting position of the holding element.

As shown in FIGS. 6 and 7, once the holding element (30) is trapped or hooked by the holding head (42), the arch (41) opens again as mentioned above and the feeding head (33) feeds as much holding element (30) as indicated by the selection dial (2b) by means of the electronic board, to facilitate the introduction of the elements (8, 9) to be joined inside the arch (41) and surrounds them by means of the holding element (30), as shown in FIG. 7. Since the holding element (30) is supplied by the feeding motor (34), the user does not need to make an extra effort to pull out the holding element (30) needed for tying. The regulation of the quantity of holding element (30) by means of the selection dial (2b) ensures an optimal adaptation to the different thicknesses of the elements (8, 9) to be joined. Once the elements (8, 9) to be joined are introduced into the arch (41), the closing mechanism (5) shown in FIGS. 9A and 9B is activated for closing the ends of the holding element (30) by means of a closing element (51). Thereto, as shown in FIGS. 8, 9A and 9B, the complete closing mechanism (5) is provided inside the handle (2) and extends from a proximal end (1a) of the tool (1) towards the feeding head (33) over the wedge (52) and below a number of closing elements (51) provided longitudinally inside the handle (2), as shown in FIG. 1. The tool (1) of the invention is also characterized in that the closing element (51) is a staple-type element, that is, its mechanical characteristics, such as hardness, rigidity and malleability are similar to those of, e.g. wire.

Preferably, as shown in FIGS. 9A and 9B, the closing mechanism (5) comprises at least two mobile rockers (53) joined crosswise by a rotation centre (54) connected to a spring (54a) on the wedge (52) in a longitudinal direction, where each rocker (53) comprises a projection (55) at a distal end (5b). Further, the set of closing elements (51) is provided longitudinally over the rockers (53) and between the projections (55). The closing mechanism (5) depends on the movement of the wedge (52), that is actuated by the main motor (6), sliding along the shaft (7) from a distal end (1b) towards a proximal end (1a). Therefore, the closing mechanism (5) at the closed position meets the proximal ends (5a) of the rockers (53) together and the distal ends (5b) of the rockers separated, as shown in FIG. 9A. In such a manner that when the wedge (52) moves towards the proximal end (1a), it pushes and opens the proximal ends (5a) of the rockers (53) and the distal ends (5b) of the rockers (53) and the projections (55) come together closing the first closing element (51) of the set of closing elements (51) provided between the projections (55), as shown in FIG. 9B. Finally, when the tying is complete and the projection (55) finishes actuating on the closing mechanism (5), the spring (54a) returns the rockers (53) to the initial position.

The invention also refers to the semiautomatic tying method of at least two elements (8, 9) to be joined by the tool (1) of the invention, as shown in the figures. The tying carried out by the tool (1) is semiautomatic, because the tool (1) is fed by the electric current to activate the motors (6, 34) and the mechanisms connected ones to the others. The semiautomatic tying method is disclosed below.

Figure 4A:
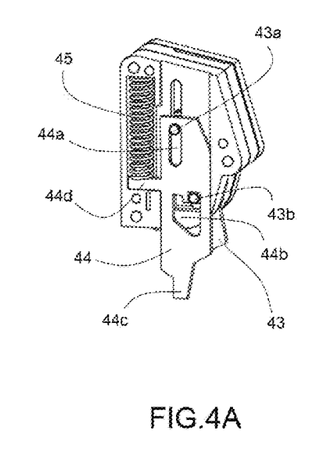
FIGS. 4A, 4B, 4C, 4D and 4E show perspective views of a sequence of movement of the holding head of the holding mechanism of FIG. 1.

Initially, in FIGS. 1 and 2, the tool (1) is in the rest position. Where the holding mechanism (4), that is, the arch (41) and the holding head (42) of the holding mechanism (4) are shown to be in an initial position, that is the position farthest to the feeding head (3) and the closing mechanism (5). The holding head (42) in the rest position comprises the hook (43) in the open and blocked position, as shown in FIGS. 2A and 4A, where the connection point (43b) is blocked at the distal end of the "U" shaped guide (44b). With respect to the feeding mechanism, it is shown that, in the initial position, the holding element (30) has been unrolled from the spool (31), it has been displaced by the guide (32) towards the feeding head (33) passing through the rollers (34b) until coming out through the groove (36), as shown in FIGS. 1, 2, 3A and 3B.

Figure 4B:
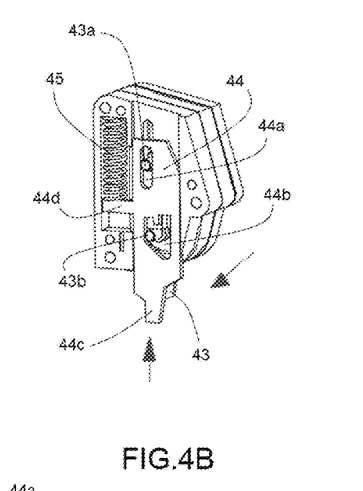

The first step for tying may be the selection, by means of the selection dial (2b) at the proximal end (1b) of the handle (2), of the quantity of holding element (30) needed to tie the elements (8, 9) to be joined, in case the user desires to change the quantity of holding element (30). To start a tying cycle, the pushbutton (2a) at the lower part of the handle (2) must be pushed for activating an electronic board managing the sequence of parameters and moments of movement of the main motor (6) and secondary motor (34), causing the main motor (6) to displace a projection (55) along a shaft in a longitudinal direction (D) and the feeding motor (34) to feed a predetermined fixed quantity of holding element (30) to be later hooked by the hook (43), as shown in FIGS. 1 to 5. After the first push, the wedge (52) follows a short trajectory, that is, it moves along the shaft (7) from a first rest position at a distal end (1b) towards the proximal end (1a) activating only the holding mechanism (4). That is, the short trajectory displacement of the wedge (52) causes a displacement in the connection point of the rod (41b) joining the arch (41) with wedge (52), thus making the arch (41) rotate around axis (41a). Therefore, the arch (41) and the holding head (42) move from the initial or rest position to a hook position, where the holding head (42) has displaced in a direction (P) until arriving at a position over the feeding head (33), as shown in FIG. 5. When the holding head (42) moves towards the feeding head (33), the lower protrusion (44c) of the activation element (44) abuts against the feeding head (33) and causes the activation element (44) to move upwards in a direction (P) with respect to the upper joint (43a), thus compressing the activation spring (45) and releasing the joint (43b) from the distal blocking, as shown in FIG. 4B. In such a manner that the lower joint (43b) tends to move towards the proximal blocking by the force of the spring (43d) of the hook (43) shown in FIG. 2A, causing the hook (34) to close in a direction (D), trapping the holding element (30) of the feeding head (33) against the fixation plate (46) of the holding head (42), the hook (43) arriving at the closed position shown in FIGS. 4B and 5.

Figure 4C:
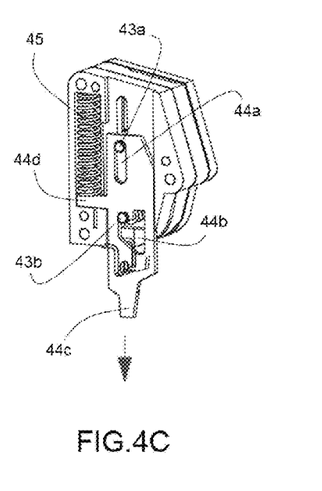

Thereafter, the following movement of the shaft (7) causes the mechanisms to return to their initial positions, including the wedge (52) that returns to the position at the distal end (1b) and causes the arch (41) and the holding head (42) to again move away from the feeding head (33) and the feeding head (33) to provide a quantity of holding elements (30) as high as indicated by the selection dial (2b). Therefore, pressure is no longer exerted onto the activation element (44) which therefore returns to the initial position thanks to the activation spring (45), the hook (43) arriving at the closed and blocked position shown in FIG. 4C, where the hook (43) is shown to hold the holding element (30) against the fixation plate (46), as shown in FIGS. 4C, 6 and 7.

Next, as shown in FIG. 7, the elements (8, 9) to be joined are introduced inside the arch (41), thus tightening the holding element (30) towards the inside of the arch (41), thereby allowing the holding element (30) to surround the elements (8, 9) to be joined with a predetermined tension. This tension generated with the introduction of the elements (8, 9) to be joined causes the area of the holding element (30) under the holding head (42) to be held under the cutting pusher (47), the guide element (48) and under the closing pusher (48b) of the holding head (42) and the other end of the holding element (30) to be placed on the closing mechanism (5). The tension generated between the holding element and the elements (8, 9) to be joined depends on the thickness thereof and on the quantity of holding element (30) fed by the feeding head (33). The quantity of holding element (30) fed can vary according to the needs of the user, by means of the selection dial (2b) sending the information to the electronic board sending the information and the activation commands to the main (6) and secondary (34) motors to determine the advance of the holding element (30).

After introducing the elements (8, 9) to be joined, the pushbutton (2a) is pushed again for activating the electronic board that manages the movements of the main motor (6) and the secondary motor (34) again. This time, the main motor (6) moves the wedge (52) over the shaft (7), although in this occasion the wedge (52) slides a longer trajectory in the same longitudinal direction (D) from the distal end (1b) towards the proximal end (1a) and to a proximal end (5a) of the closing mechanism (5), such that this displacement causes the activation of the holding mechanism (4) and the closing mechanism (5) at the same time.

Figure 4D:
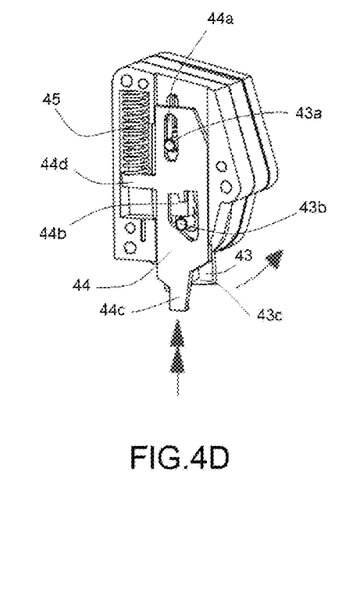
Figure 4E:
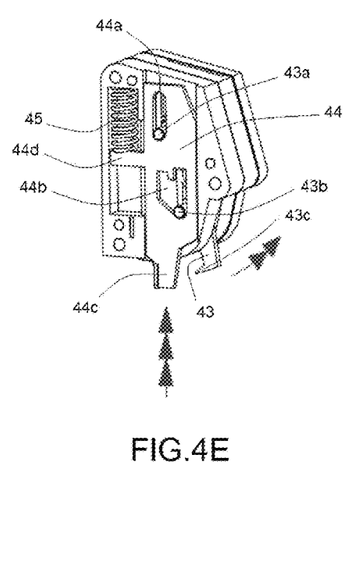

This time, the more prolonged displacement of the wedge (52) along the shaft (7) causes the point of connection of the rod (41b) with the arch (41) to move further, causing the arch (41) to rotate from the axle (41a) and the holding head (42) forming the holding mechanism (4) to move from the initial or rest position to a closing position, where the holding head (42) has displaced in a direction (P) until entering the closing mechanism (5) of the handle (2), as shown in FIG. 8. In this position, the elements (8, 9) to be joined are inside the arch (41) completely surrounded by the holding mechanism (30). In this step, the lower protrusion (44c) of the activating element (44) is caused to abut stronger against the feeding head (33) because this time the holding head (42) has moved more than in the hook position, as shown in FIGS. 4D to 4E. That is, the activating element (44) moves upwards in a direction (P), releasing a lower joint (43b) and causing the hook (43) to open in a direction (D) due to the inclination and pressure exerted against the base of the lower guide (44b) and thereby causing the hook (43) to open and release the holding element (30) from the fixation plate (46). However, as shown in FIG. 8, since the arch (41) and the holding head (42) are closed, elements such as the guide element (48a) and the closing pusher (48b) block the double holding element (30) inside the set of closing elements (51) inside the handle (2). Thus, the cutting pusher (47) is placed on the blade (35) with the double holding element trapped between the protrusions (47a, 74b). In such a way that, by the pressure exerted by the protrusions (47a, 47b) of the cutting pusher (47) on the holding element (30) against the blade (35), the end of the non-free holding element (30), joined to the spool (31), is cut.

Just before the cut, the prolonged displacement of the wedge (52) along the shaft (7) also causes the activation of the closing mechanism (5) which, in turn, causes the wedge (52) to enter between the proximal ends (5a) of the rockers (53) joined in a crosswise manner by a rotation centre (54), causing the proximal ends (5a) to open a the distal ends (5b) to close, making the projections (55) of the rockers (53) to come closer one to the other, pressing the closing element (51) provided between the projections (55), as shown in FIGS. 9A and 9B. In this manner closing the double holding element (30) surrounding the elements (8, 9) to be closed with the closing element (51). That is, the end of the closing process of the closing element (51) around the double holding element (30) and the cut of the holding element (30) are made coincident in time, thus finishing the tying task by the tool (1), as shown in FIG. 10.

Once the closing process is finished, the tool returns to the initial position of FIG. 1, the arch (41) being open and the hook (43) being open and blocked as in FIGS. 2A and 4A, causing all mechanisms to return to the initial position.

In view of all the above, a tool (1) that semiautomatically ties at least two elements (8, 9) to be joined by means of an elastic holding element (30) and a staple-like closing element (51) of the holding element (30) is achieved.

The invention claimed is:

1. A tying tool for tying at least two elements to be joined by a holding element and a closing element of the holding element, wherein the tool comprises a longitudinal handle extending in a longitudinal direction from a proximal end to a distal end, a spool disposed at the proximal end, wherein the holding element is rolled on the spool, and a holding mechanism disposed at the distal end and comprising a movable arch extending from a central area of the handle towards a holding head,
   wherein the tying tool is semiautomatic, by the manual activation of a pushbutton activating at least a main motor and a secondary motor,
   wherein the main motor is connected to and activates the holding mechanism and the closing mechanism by a closing element,
   wherein the closing mechanism is provided inside the handle and the holding head of the holding mechanism is provided on a feeding head,
   wherein the secondary motor is connected to and activates a feeding mechanism of the holding element which comprises a guide extending from the spool of the proximal end to the feeding head at the distal end where the holding element exits, and
   wherein the holding element is a flexible and elastic elastomer surrounding the at least two elements to be joined and the holding element is closed by the closing element.

2. The tying tool according to claim 1, wherein the closing element is hard, rigid, and malleable.

3. The tying tool according to claim 1, wherein the main motor is connected to a shaft provided inside the handle and activates the movement of a wedge connected to the movable arch of the holding mechanism by at least a rod connected to the movable arch rotating with respect to an axis at a central area of the handle.

4. The tying tool according to claim 1, wherein the holding head comprises an activating element and a hook joined and movable one with respect to the other at the distal end of the tool, wherein the activating element is movable in a direction perpendicular to the longitudinal direction and comprises at least two upper and lower guides, a lower protrusion and a lateral protrusion connected to an activating spring, and wherein the upper guide is longitudinal in a direction and the lower guide comprises a "U" shape having a base inclined in a direction and two upper ends intended to block an open and closed position of the hook.

5. The tying tool according to claim 4, wherein the hook is movable in a longitudinal and radial manner from at least two upper and lower connection points, connected by a spring and wherein the hook comprises a longitudinal body having a punch at a lower end.

6. The tying tool according to claim 4, wherein the activating element and the hook are joined by at least two connection points, and wherein the upper connection point is movable inside the upper guide of the activating element in a perpendicular direction and the lower connection point is movable inside the lower guide of the activating element in at least two directions longitudinal and perpendicular.

7. The tying tool according to claim 1, wherein the holding head comprises a fixation plate, a cutting pusher, a guide element and a closing pusher positioned in a fixed manner from a distal end towards a proximal end respectively.

8. The tying tool according to claim 7, wherein the fixation plate comprises a hole opposing a protruding punch of a hook of the holding head.

9. The tying tool according to claim 1, wherein the feeding head comprises at least a gear system joined to at least a system of opposing rollers facing each other, wherein the holding element is guided in a perpendicular direction towards a groove at the distal end activated by the secondary motor.

10. The tying tool according to claim 9, wherein at least one of the opposing rollers has grooves.

11. The tying tool according to claim 1, wherein the closing mechanism of the holding element by the closing element comprises at least two rockers joined in a crosswise manner by a rotation centre and a spring on a wedge in the longitudinal direction, wherein each rocker comprises a protrusion at the distal end, wherein a set of closing elements is provided on each rocker and between the protrusions and wherein the movement of the rocker is activated by the movement of the wedge.

12. The tying tool according to claim 1, wherein the tool comprises a selection dial at the proximal end of the handle that determines the quantity of holding element supplied by the feeding head a connection to an electronic board sending the information and the movement orders to the main and secondary motors.

* * * * *